United States Patent
Koester

(10) Patent No.: US 8,356,206 B2
(45) Date of Patent: Jan. 15, 2013

(54) METHOD AND SYSTEM FOR REPAIRING DAMAGED DISK FILE SYSTEMS

(75) Inventor: William Charles Koester, Grosse Ile, MI (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 12/733,241

(22) PCT Filed: Feb. 19, 2008

(86) PCT No.: PCT/US2008/002167
§ 371 (c)(1),
(2), (4) Date: Feb. 19, 2010

(87) PCT Pub. No.: WO2009/025683
PCT Pub. Date: Feb. 26, 2009

(65) Prior Publication Data
US 2010/0153773 A1      Jun. 17, 2010

Related U.S. Application Data

(60) Provisional application No. 60/965,605, filed on Aug. 21, 2007.

(51) Int. Cl.
*G06F 11/00* (2006.01)
(52) U.S. Cl. ............................. 714/15; 714/21
(58) Field of Classification Search .......... None
See application file for complete search history.

(56) References Cited

U.S. PATENT DOCUMENTS

| | | | |
|---|---|---|---|
| 6,553,532 B1 | 4/2003 | Aoki | |
| 7,143,120 B2 * | 11/2006 | Oks et al. | 707/679 |
| 7,472,138 B2 * | 12/2008 | Adkins et al. | 1/1 |
| 7,657,796 B1 * | 2/2010 | Kaiser et al. | 714/54 |
| 7,930,490 B2 * | 4/2011 | Boggs et al. | 711/154 |
| 2003/0163594 A1 | 8/2003 | Aasheim et al. | |
| 2005/0007826 A1 * | 1/2005 | Boggs et al. | 365/189.01 |

FOREIGN PATENT DOCUMENTS

| | | |
|---|---|---|
| EP | 0767435 | 4/1997 |
| JP | 2000-112831 | 4/2000 |
| JP | 2005-242708 | 9/2005 |

OTHER PUBLICATIONS

International Search Report dated Jul. 8, 2008.

* cited by examiner

*Primary Examiner* — Michael Maskulinski
(74) *Attorney, Agent, or Firm* — Robert D. Shedd; Paul P. Kiel

(57) ABSTRACT

The present principles include methods and apparatus for repairing corrupted files systems of storage devices. In accordance with aspects of the present principles, a listing of sectors to which data is most recently written is retrieved upon interruption of writing operations on a storage medium. The listing is employed to implement a targeted search for sectors that are most likely to be corrupted. The sectors providing in the listing are examined and sectors including errors are identified. Thereafter, the errors are corrected.

11 Claims, 5 Drawing Sheets

METHOD AND SYSTEM FOR REPAIRING DAMAGED DISK FILE SYSTEMS

This application claims the benefit, under 35 U.S.C. §365 of Internation Application PCT/US2008/002167, filed Feb. 19, 2008, which was published in accordance with PCT Article 21(2) on Feb. 26, 2009 in English and which claims the benefit of United States provisional patent application No. 60/965,605, filed Aug. 21, 2007.

TECHNICAL FIELD

The present principles generally relate to data storage and more particularly to methods and systems for repairing damaged file systems on storage devices.

BACKGROUND

A common problem associated with repairing damaged file systems on storage devices is that known methods of repair are often slow and consume a considerable amount of resources. Known methods for repairing file systems rely on scanning the entire storage mechanism to identify and repair damaged sectors. For example, FIG. 1 depicts a prior art method for repairing a file system on a hard disk drive that was corrupted as a result of a power failure.

Corruption of sectors in this scenario typically stems from interruption of a writing operation on sectors of a disk drive. Upon a boot up of a computing system subsequent to a power failure, step 104, a repair utility would begin scanning the hard disk drive for defective sectors. The scan comprises examining each sector, step 108, to determine whether any of the sectors includes an error, step 112. Upon determination that a sector includes an error, the repair utility corrects the error, step 116, and continues to scan all sectors and repair errors until the last sector is reached. This process often requires several minutes to several hours to complete on large storage devices.

SUMMARY

In accordance with an aspect of the present principles, the time needed to repair damaged sectors on a storage device may be reduced by circumventing the need to scan an entire storage device for errors. Aspects of the present principles include storing sector identifiers corresponding to sectors, or portions of the storage device, which are most likely to be corrupted. The identifiers may be employed to conduct a targeted search for errors on a storage device.

One implementation of the present principles includes a method for repairing a file system on a storage medium damaged as a result of an interruption of a writing operation comprising: receiving a write data command; storing a sector identifier corresponding to a sector of a storage medium in a sector ID listing identifying the most recently written sectors in response to receiving said write data command; writing data to said sector in accordance with said write data command; retrieving said sector identifier; determining whether said sector includes an error; and correcting an error in said sector, wherein said retrieving, determining and correcting is performed independently of a filesystem.

Another implementation of the present principles includes a system for repairing a file system on a storage medium damaged as a result of an interruption of a writing operation comprising: a storage medium; a sector ID listing that identifies storage medium sectors in which data was most recently written; a command processor configured to: receive a write data command, store, in said listing, a sector identifier corresponding to a sector of the storage medium in response to receiving said write data command, and write data to said sector in accordance with said write data command; and a repair module configured to: retrieve said sector identifier, determine whether said sector includes an error, and correct an error in said sector, wherein the retrieving, determining and correcting is performed independently of a filesystem.

The details of one or more implementations are set forth in the accompanying drawings and the description below. Even if described in one particular manner, it should be clear that implementations may be configured or embodied in various manners. For example, as described above, an implementation may be performed as a method, or embodied as an apparatus configured to perform a set of operations or an apparatus storing instructions for performing a set of operations. Other aspects and features will become apparent from the following detailed description considered in conjunction with the accompanying drawings and the claims.

BRIEF DESCRIPTION OF THE DRAWINGS

The teachings of the present principles can be readily understood by considering the following detailed description in conjunction with the accompanying drawings, in which.

Figure 1:
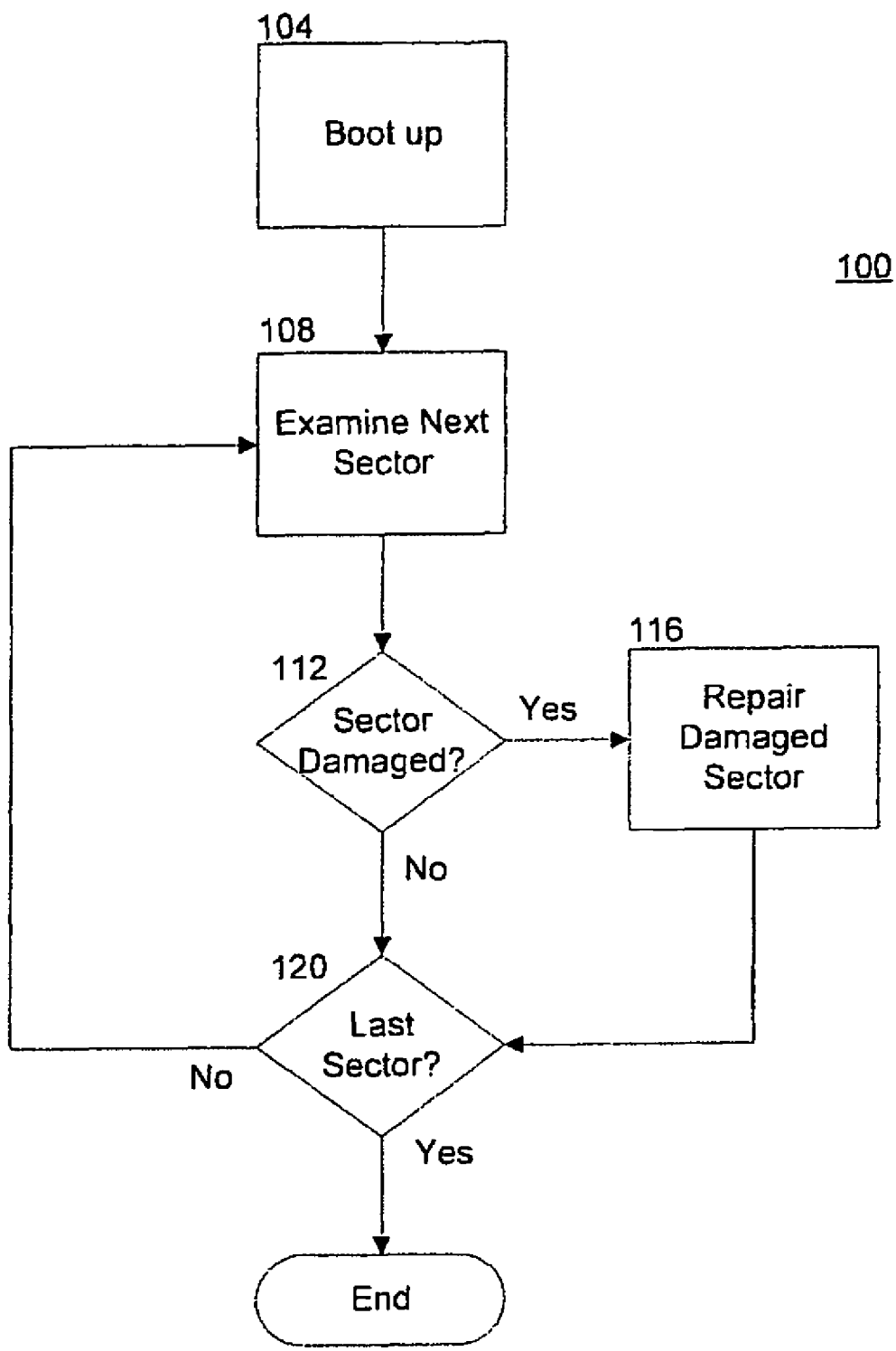
FIG. 1 is a flow diagram depicting a prior art method for repairing corrupted sectors of a storage medium.

It should be understood that the drawings are for purposes of illustrating the concepts of the invention and are not necessarily the only possible configuration for illustrating the present principles. To facilitate understanding, identical reference numerals have been used, where possible, to designate identical elements that are common to the figures.

DETAILED DESCRIPTION

The present principles provide methods and systems for repairing damaged file systems on a storage device. One aspect of the present principles includes storing sector identifiers to provide the location of sectors to which data was most recently written. The identifiers are useful in repairing sectors that were corrupted upon an interruption of a writing operation, which may occur, for example, as a result of a power failure. Thus, aspects of the present principles may be utilized to quickly determine which sectors are damaged, in lieu of randomly scanning large portions of a storage device. Detailed descriptions of some implementations of the present principles employing these aspects are provided below with reference to the Figures.

It should be noted that the functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and implementation of the present principles, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry implementing the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Figure 2:
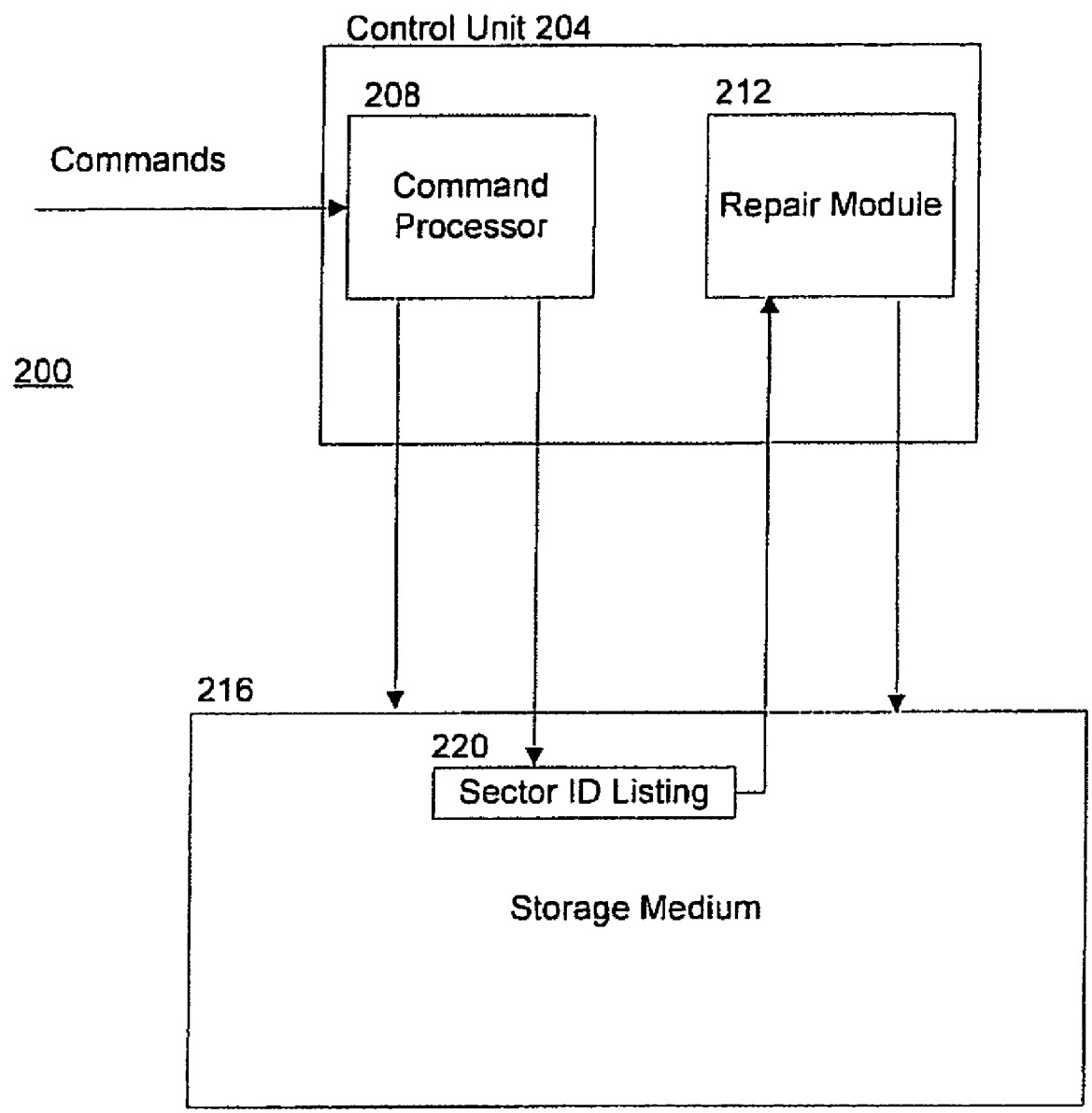
FIG. 2 is a block diagram depicting an exemplary system for repairing damaged a file system on a storage device.

Referring now in specific detail to the drawings in which like reference numerals identify similar or identical elements throughout the several views, and initially to FIG. 2 an exemplary system 200 in accordance with an aspect of the present principles may be utilized in repairing a file system on a storage medium that was damaged as a result of interruptions of writing operations. The system 200 may include a control unit 204 configured to control data writing on a storage medium 216. The control unit 204 may include a command processor 208 that receives and implements write commands on the storage medium 216. Additionally, the command processor 208 also writes sector identifiers (IDs) in a sector identifier (ID) listing 220 in accordance with aspects of the present principles described more fully below. The sector ID listing 220 may include a listing of sector IDs that identify the sectors, which designate portions of the storage device, to which data was most recently written. Moreover, although the listing 220 is depicted as being within storage medium 216, it may be located on a completely separate storage mechanism. The repair module 212 may employ the sector identifier listing 220 to discover and repair errors according to aspects of the present principles described more fully below with reference to FIGS. 3 and 4.

Figure 3:
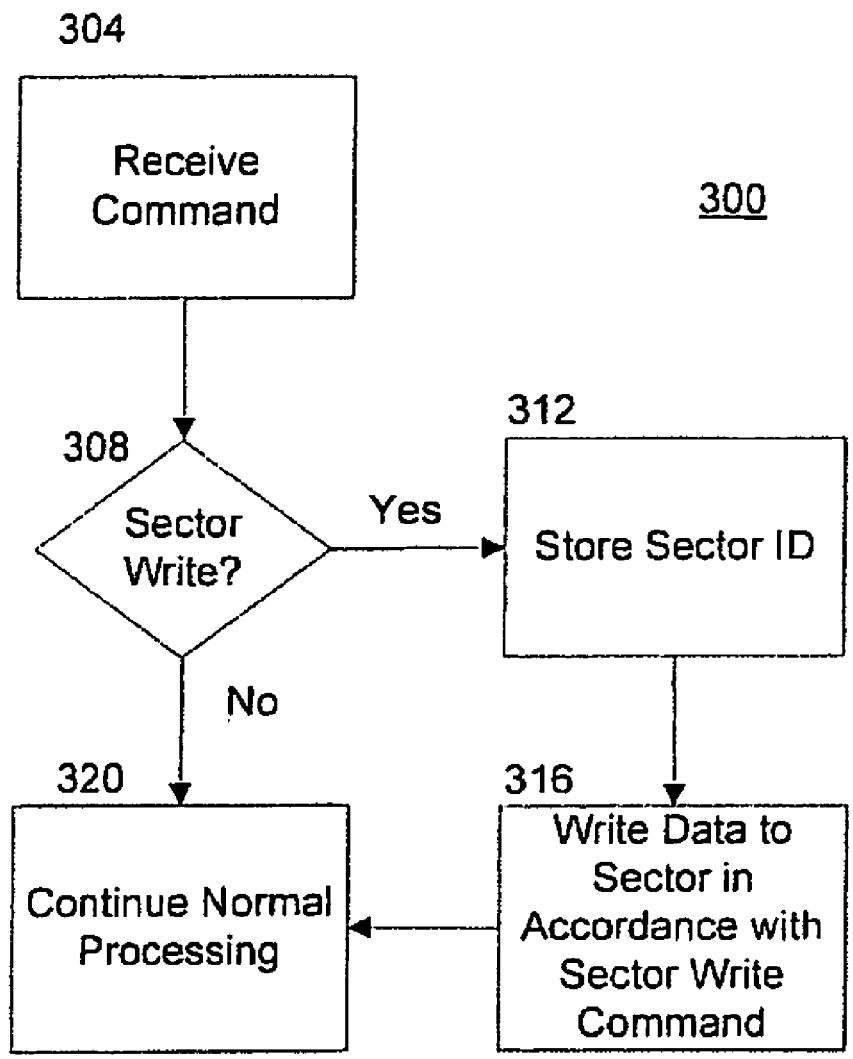
FIG. 3 is a flow diagram depicting an exemplary method for compiling a listing of sector identifiers corresponding to sectors to which data was most recently written.

Referring to FIG. 3 with continuing reference to FIG. 2, an exemplary method 300 in accordance with an aspect of the present principles that may be utilized in repairing a file system on a storage medium that was damaged as a result of interruptions of writing operations is illustrated. Causes of such interruptions may include power failures, processor freezes and the like. FIG. 3 illustrates a method for compiling a list of sector identifiers corresponding to sectors to which data was most recently written.

The method begins by receiving a command, step 304. For example, the control unit 204, which may controls the reading and writing to a storage medium, may receive the command. Upon receiving a command, the command processor 208 in accordance with an aspect of the present principles determines whether the command is an instruction to write data to a sector in a storage medium, step 308. If the command is not a sector write command, normal processing is continued, step 220. However, if it is determined that the command is a sector write command, then the command processor 208 stores a sector identifier (ID) corresponding to the sector to which data is to be written in accordance with the write command in a sector ID listing 220, step 312. The sector ID may be any tag that identifies the location of the sector, or portions of the storage medium, to which data will be written. Moreover, the sector ID listing 220 may be stored in a location that is separate from the sector in which data is to be written. For example, the sector ID listing 220 may be stored in a dedicated sector or a small amount of non-volatile RAM. Furthermore, the storage location of the sector ID listing 220 may be on the same storage medium to which the data is to be written or it may be on a completely separate storage device.

Upon storing the sector ID, the command processor 208 writes data in the sector corresponding to the stored sector ID in accordance with the sector write command, step 316. Thereafter, normal processing is continued, step 220, and the process is repeated as necessary in accordance with any additional write commands imposed on the system. Although data is written to the storage medium 216 after the sector ID is stored in the implementation depicted in FIG. 3, in other implementations the sector ID may be stored simultaneously with the write operation. In addition, it should be understood that the sector ID listing 220, as mentioned above, may comprise a plurality of sector IDs that identify the sectors to which data was most recently written. For example, the listing may describe the last several sectors to which data was written in chronological order. The number of sector IDs stored in the sector ID listing 220 may be a single sector ID or a multitude of sector IDs, depending on design choice. In one implementation, the listing of sector IDs 220 may be stored in a ring buffer incorporating a predetermined number of sector IDs. A ring buffer may, for example, include seven elements corresponding to seven sector IDs. If the ring buffer is full, the oldest sector ID is overwritten as each new sector ID is stored in the ring buffer. As described above, the process is repeated and the listing is continually updated as each new write command is introduced.

Figure 4:
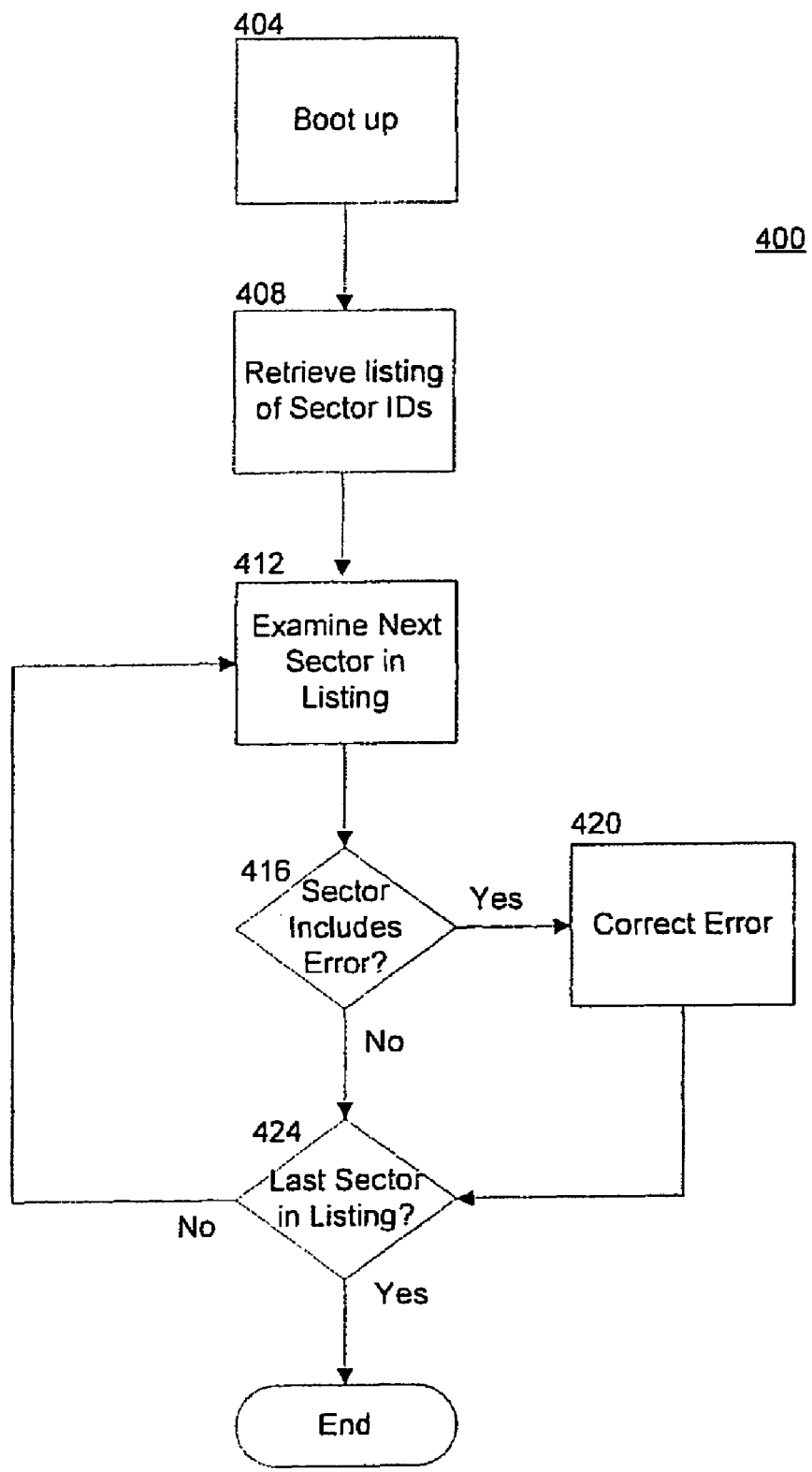
FIG. 4 is a flow diagram of an exemplary method for employing a sector identifier listing to conduct a targeted search for corrupted sectors and correct errors included in damaged sectors.

As described above, sectors on a storage medium may be corrupted due to an interruption of a writing operation on the sectors, which may result from a power failure, a processor freeze or any other event that prevents the successful completion of a writing operation. The compiled sector ID listing 220 may be utilized to quickly identify sectors that may be corrupted as a result of such an interruption. As discussed above, employing the compiled sector ID listing 220 negates the need to scan large portions of a storage medium, which thereby may significantly reduce the time needed to repair file systems on the storage medium. FIG. 4 illustrates a method of repairing a file system utilizing the compiled sector ID listing 220 described above.

Referring to FIG. 4 with continuing reference to FIG. 2, a method 400 may be employed to correct errors resulting from interruption of writing operations due to a power failure. Accordingly, the process may begin by booting up a processor and a storage medium on which data was written, step 404. However, the method may also begin, for example, upon restoration of normal processing subsequent to a processor freeze or any other cause of a writing interruption. After interruption and resumption of normal processing, in step 408, the repair module 212 retrieves the sector ID listing 220 by querying the contents of a ring buffer, a dedicated sector, or any other means employed to store the listing. As stated above, the sector ID listing 220 may include a single sector ID or a plurality of sector IDs that correspond to the sectors to which data was most recently written prior to the retrieving step.

After retrieving the listing, the repair module 212 examines the sectors corresponding to the sector IDs of the sector ID listing 220, step 412. Upon examining a sector, the repair module 212 determines whether the sector includes an error, step 416. If the sector does not include an error, then the repair module 212 examines the next sector identified in the sector ID listing 220, step 412, upon its determination that the examined sector is not the last sector, step 424. However, if the sector is determined to have an error, the repair module 212 corrects the error, step 420, and examines next sector identified in the sector ID listing 220, step 412, upon its determination that the examined sector is not the last sector, step 424. Thereafter the next sector is corrected, step 420, if necessary, and the process continues until the last sector identified in the listing is reached.

In one implementation of the present principles, the error is corrected by overwriting all of the data in the sector, for example, by writing all zeros in the sector. As described above, many errors result from interruption of a writing operation on a sector. A common effect of such interruptions is a write-splice, in which new data is written at the beginning of a sector and old data with an old checksum remains at end of the sector. The checksum is the sum of bits in a sector and is employed to verify that there are no errors in the sector. In many file systems, if the checksum does not match the data within a sector, the sector is considered "unreadable." File system repair programs, such as, for example, an XFS repair program, xfs_repair, require that all sectors be readable or the program will fail. Correcting the error by overwriting the data in the sector ensures that the checksum matches the data, thereby permitting file system repair programs to successfully run system recovery routines. In such a case, even though a portion of the data has been deleted by overwriting the sector having the error, the file system utility can read the data on the sectors and at least run a system recovery routine. In this manner the present invention operates independently of a file system, that is, the invention corrects errors included within specified sectors, before system recovery is attempted at the file system level.

According to another aspect of the present principles, the repair module 212 may examine sectors in chronological order, beginning with the most recently written sector, as provided in the sector ID listing 220. Thus, by employing the listing, a targeted search, within a few sectors, may be performed to determine which sectors were being written when the writing interruption occurred. Furthermore, the search and repair of damage sectors may be completed within a few seconds, as opposed to several minutes to several hours required for the repair of damaged sectors within a large storage medium in accordance with previously known methods.

An additional beneficial feature of a method according to aspects of the present principles described above is that it may be implemented on the storage medium level, outside of a device's main filesystem that stores and organizes the device's files and data. For example, the write command received in step 304 in FIG. 3 may be generated by the filesystem, in response to which the sector identifier is stored on the storage medium level. Moreover, the repair steps 408-424 in FIG. 4 may also be performed on the storage medium level prior to running a filesystem repair program. This aspect may avoid problems associated with file system repair programs. As discussed above, some file system repair programs, such as, for example, an XFS repair program, xfs_repair, require that all sectors be readable or the program will fail. Because the repair process according to aspects of the present principles may be performed prior to running a filesystem repair program, file system repair programs may properly read corrected sectors to successfully execute system recovery. Again, the invention is able to correct the errors independently of the filesystem, and the filesystem repair program.

The methods in accordance with aspects of the present principles described above may also be applied to processing systems in which commands, such as reading and writing, are performed within a fixed time interval. For example, systems operating under a fixed time constraint include personal video recorders. In a personal video recorder system, the reading and writing of audio/video stream information are completed within a fixed time interval. If the system does not complete a transaction within the fixed time interval, the personal video recorder (PVR) moves onto the next part of the presentation and the information associated with an incomplete transaction may be either lost or discarded. The constraint is due to the desirability to timely display as much of a presentation as possible. Thus, when audio or video data arrives too late, it is discarded to prevent the PVR record-play system from breaking down.

In situations in which an interruption of a writing operation occurs and sectors of data are corrupted, oftentimes the data within the sectors are discarded as a result of the fixed time constraints described above. For example, upon a boot up of the PVR system after a power failure, the most recently written audio/video data may be discarded because the data may not be properly read within the fixed time interval. A large number of PVR systems do not even incorporate processes for repairing damaged file systems within their storage mediums. Software on these PVR systems normally treat the storage devices as non-volatile memory; they assume that data once written will always be available for nearly instantaneous reading. One reason for this is that PVR systems are often designed to use minimal operating resources. The repair methods described above require a relatively small amount of memory and may be implemented independently of a filesystem, which tend to employ recovery programs that consume a relatively large amount of resources.

Moreover, even if previously known methods for repairing file systems were applied to a PVR, they often will not prevent the discarding of such audio/video data, as any repair operation will likely not be completed within the fixed time constraint. In contrast, the present principles may be employed to quickly identify and repair sectors within a fixed time interval imposed by a PVR system to retain information that otherwise would have been discarded due to the fixed time constraint. As described above, the repair methods according to aspects of the present principles may be implemented independently of a filesystem and require very little resources, thereby permitting corrupted sectors to be corrected quickly.

Figure 5:
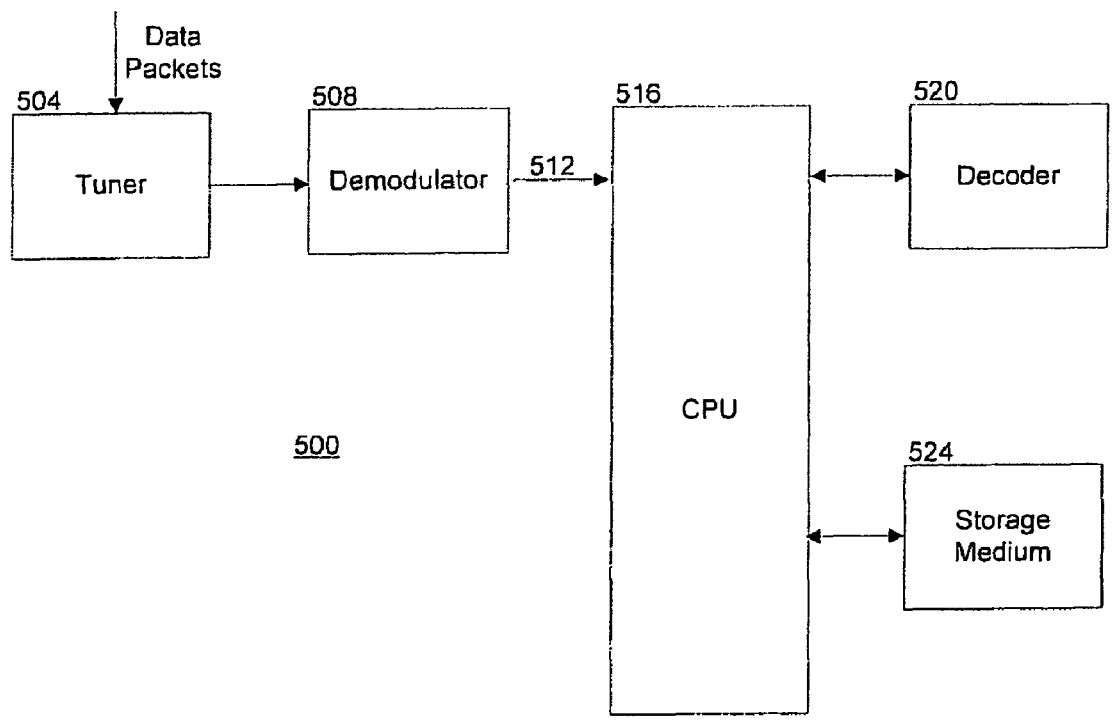
FIG. 5 is a block diagram of an exemplary personal video recorder system configured to employ a sector identifier listing to conduct a targeted search for corrupted sectors and to correct errors included in damaged sectors.

FIG. 5 is a block diagram depicting an illustrative example of a personal video recorder 500 in accordance with aspects of the present principles. The PVR 500 may include a processor 516 and a storage medium 524. The storage medium 524 may be a hard disk drive and may utilized to store both the sector ID listing 220 and the data to be written in accordance with write data commands. However, as described above, in other implementations, the sector ID listing 220 may be stored in a storage mechanism completely separate from the storage medium in which the data is written in accordance with write commands. The central processing unit 516 may comprise, for example a BCM 7038 C2 chip, commercially available from Broadcom®, which is a dual channel HD video/audio/graphics and personal video recording chip that incorporates a 300 MHz 64-bit CPU. The BCM 7038 C2 is a common processor employed in personal video recorders.

In one implementation of the present principles, audio/video data packets in MPEG-4 compression format received via satellite technology circuitry may be transmitted to the CPU 516 through stream 512. For example, a tuner 504 may tune to the appropriate frequency and receive the data packets. In addition, a demodulator 508 may synchronously demodulate an output signal from the tuner and provide audio/video data packets to the CPU 516 through stream 512. Thereafter, the audio/video data may be decompressed by utilizing decoder 520, which may comprise a BCM 7411 CO decoder, also commercially available from Broadcom®. The BCM 7411 CO decoder is compatible with MPEG-4 video streams. However, it should be understood that the audio/video data may be in any format known in the art, such as, for example, MPEG-2, and may be received by other means, such as, for example, via cable television transmission. Upon receipt of audio/visual data in an audio/video data stream, the CPU 516 may be configured via suitable software and hardware to implement the method steps described above.

It should also be understood that when power is removed from the PVR, only a finite amount of time will be available to complete the writing cycles that are in progress. To completely avoid the corruption of sectors including written media data during power removal, the PVR should properly shut down its system components. However, the storage medium 524 cannot predict the shutdown sequence, as it is typically optimized for computer use. Thus, data will continue to be written into its sectors, despite the imposition of a shut down sequence. As a result, sectors at some point will inevitably be left in a partially-written state due to normal power-down operations. Sector corruption as a result of a normal shutdown sequence, in addition to other common causes of writing interruption, such as, for example, power failure and processor freezes, may be corrected by applying methods in accordance with aspects of the present principles described above. The CPU 516 may be configured to perform the storage medium repair method according to aspects of the present principles described above by employing the stored sector ID listing upon booting up after power removal or upon the recovery of normal processing operations subsequent to any other type of writing interruption. As discussed above, corrupted sectors within a storage mechanism may be discovered and repaired within the time constraints imposed by a PVR. Thus, data that would otherwise be discarded in a PVR may be retained by utilizing a processor adapted to implement repair methods of the present principles.

Features and aspects of described implementations may be applied to various applications. Applications include, for example, personal computers and web servers, or any other application in which reduction of repair time of damaged file systems on storage devices are desirable. However, the features and aspects herein described may be adapted for other application areas and, accordingly, other applications are possible and envisioned. Additionally, protocols and communication media other than radio frequency satellite devices and cable devices may be used. For example, data may be sent and received over (and using protocols associated with) fiber optic cables, universal serial bus (USB) cables, small computer system interface (SCSI) cables, telephone lines, digital subscriber line/loop (DSL) lines, line-of-sight connections, and cellular connections.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data storage. Examples of equipment include video coders, video decoders, video codecs, web servers, set-top boxes, laptops, personal computers, and other storage devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream, and modulating a carrier with the packetized stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are within the scope of the following claims.

The invention claimed is:

1. A method, comprising:
receiving a write data command;
writing data to a storage medium in accordance with said write data command;
storing an identifier corresponding to a sector of a storage medium in a sector ID listing identifying the most recently written sectors in response to the writing;
retrieving said identifier in response to an interruption of the writing, wherein retrieving further includes retrieving said listing;

determining whether said sector corresponding to said identifier includes an error; and correcting the error in said sector, wherein said retrieving, determining and correcting are performed independently of a file system; and examining a plurality of sectors corresponding to a plurality of identifiers in chronological order according to said listing, beginning with the sector to which data was most recently written, to determine whether any of said plurality of sectors includes an error.

2. The method of claim 1, wherein said storage medium is included in a video recording device.

3. The method of claim 2, wherein said retrieving is performed upon a boot up operation of the video recording device.

4. The method of claim 1, wherein the identifiers are stored in a predetermined location that is separate from a location in which said data is written to said storage medium.

5. The method of claim 4, wherein the identifiers are stored in a ring buffer on non-volatile memory of said storage medium.

6. The method of claim 1, wherein said retrieving is performed in response to an interruption of writing said data to said storage medium.

7. A system for repairing a file system on a storage medium comprising:
   a storage medium;
   a sector ID listing that identifies storage medium sectors in which data was most recently written;
   a processor configured to:
   receive a write data command,
   store, in said listing, a sector identifier corresponding to a sector of the storage medium in response to receiving said write data command, and
   write data to said sector in accordance with said write data command; and
   a repair module configured to:
   retrieve said sector identifier in response to an interruption of a write operation,
   determine whether said sector includes an error, and
   correct an error in said sector, wherein the retrieving, determining and correcting is performed independently of a file system;
   wherein the repair module is further configured to retrieve said listing and wherein the repair module is further configured to examine a plurality of sectors corresponding to a plurality of sector identifiers in chronological order according to said listing, beginning with the sector to which data was most recently written, to determine whether any of said plurality of sectors includes an error.

8. The system of claim 7, wherein said system is included in a video recorder.

9. The system of claim 7, wherein said repair module retrieves said listing in response to a boot up operation.

10. The system of claim 7, wherein the sector identifiers are stored in a pre-determined location that is separate from a location in which said data is written to said storage medium.

11. The system of claim 10, wherein the sector identifiers are stored in a ring buffer on non-volatile memory of said storage medium.

* * * * *